United States Patent [19]
Hong

[11] Patent Number: 5,404,230
[45] Date of Patent: Apr. 4, 1995

[54] COLOR BURST PHASE CORRECTING COLOR SIGNAL REPRODUCING CIRCUIT

[75] Inventor: Kuen-Pyo Hong, Suweon-city, Rep. of Korea

[73] Assignee: SamSung Electronics Co., Ltd., Kyungki-do, Rep. of Korea

[21] Appl. No.: 723,175

[22] Filed: Jun. 28, 1991

[30] Foreign Application Priority Data

Jul. 6, 1990 [KR] Rep. of Korea ............... 9911/1990

[51] Int. Cl.⁶ .................. H04N 9/45; H04N 9/455; H04N 9/79
[52] U.S. Cl. ...................... 358/326; 348/500; 348/506; 348/536; 348/537; 348/539
[58] Field of Search .............. 358/316, 317, 318, 319, 358/310, 324, 325, 326, 334, 335, 17, 19, 20, 21 R, 25, 26, 27, 36, 37, 153, 154, 155, 160, 166, 167; 348/500, 505, 506, 525, 528, 536, 537, 539

[56] References Cited
U.S. PATENT DOCUMENTS

| | | | |
|---|---|---|---|
| 3,760,095 | 9/1973 | Furuhashi et al. | 358/25 |
| 4,068,257 | 1/1978 | Hirota et al. | 358/316 |
| 4,626,890 | 12/1986 | Ryan | 358/19 |
| 4,851,928 | 7/1989 | Numakura et al. | 358/310 |
| 5,119,194 | 6/1992 | Yamaguchi et al. | 358/166 |

Primary Examiner—Tommy P. Chin
Assistant Examiner—Khol Truong
Attorney, Agent, or Firm—Robert E. Bushnell

[57] ABSTRACT

A color signal reproducing circuit comprising a phase correction device receiving a gain-controlled composite color signal, detecting color burst signal in a composite color signal and correcting phase of the color burst signal by using a 3.58 MHz signal, first gate for receiving the gain-controlled composite color signal and passing only a color signal when a color burst pulse in the delayed horizontal synchronizing signal applied from the delay device is at a low level, and mixer for mixing the phase-corrected color burst signal and the color signal from the first gate to produce a phase-corrected composite color signal.

16 Claims, 3 Drawing Sheets

COLOR BURST PHASE CORRECTING COLOR SIGNAL REPRODUCING CIRCUIT

BACKGROUND OF THE INVENTION

1. Field of the Invention

The present invention relates to a color signal reproducing circuit of a magnetic recording and reproducing apparatus, and more particularly to a color signal reproducing circuit to accurately correct phase of reproduced color signal.

2. Description of the Prior Art

In general, a magnetic recording and reproducing apparatus such as a video tape recorder is provided in which a color signal is converted at low range frequency and recorded on magnetic tape or disk, and the color signal is read out on magnetic tape or disk and converted into a chrominance signal before mixing with the luminance signal read by reproducing head.

A conventional color signal reproducing circuit is shown in FIG. 1. Referring to FIG. 1, a video signal from input terminal 1 is read out by the reproducing head in a magnetic recording and reproducing apparatus. The video signal is applied to low pass filter 10 and thus converted into a composite chrominance signal containing 629 kHz±500 kHz±F′, whereas F′ is phase information of the reproducing head. The composite chrominance signal is applied to an automatic gain controller 20, thus followed up in accordance with the level of the color burst signal and thus controlled in its gain to be converted into a predetermined composite color signal. The gain-controlled composite color signal is applied to a main converter 30 which adopts a difference between the composite color signal and 4.2 MHz±F′ frequency signal outputted from a sub-converter 60, and thus produces a 3.5 MHz±500 kHz chrominance signal.

The sub-converter 60 produces a 3.48 MHz±629 kHz±F′ frequency signal which includes a 629 kHz±F′ frequency signal added phase information signal of the reproducing head to 40 fh reference frequency, whereas fh is horizontal synchronising signal of the video signal, and 3.58 MHz generated by an automatic phase controller 80. The 3.58 MHz±629 kHz±F′ frequency signal is outputted through a band pass filter 40 to the main converter 30, then 4.2 MHz±F′ of frequency signal is output from the band pass filter 40 and applied to the main converter 30.

Such a color signal reproducing circuit is provided in which color burst signal is detected from output signal of the main converter 30 by burst gate means 70 and applied to the automatic phase controller 80 so as to limit jitter contained within the color burst signal. Further, the automatic phase controller 80 produces gain-controlled 3.5 MHz frequency signal to be applied to the sub-converter 60.

Since the prior art a color signal reproducing circuit, however detects color burst signal after converting video signal into chrominance signal as being color signal, there are problems that the construction is complicate and accurate phase correction of the color burst signal is difficult.

SUMMARY OF THE INTENTION

To solve the problems as described above, an object of the present invention is to provide a color signal reproducing circuit which can detect color burst signal within composite color signal before converting the composite color signal into chrominance signal as being color signal, so as to accurately correct phase of the color burst signal.

Another object of the invention is to provide a color signal reproducing circuit in which its construction is simple.

In order to achieve the objects, the present invention is provided with a color signal reproducing circuit comprising:

a phase correction device receiving a gain-controlled composite color signal, detecting color burst signal in the composite color signal and correcting the phase of the color burst signal with a 3.58 MHz generated signal;

a first gate device for receiving the gain-controlled composite color signal and passing only a color signal in which the luminance signal is deleted, when color burst signal in the delayed horizontal synchronizing signal applied from the delay is low level; and mixer mixing the phase-corrected color burst signal and the color signal from the first gate means to produce phase-corrected composite color signal; the phase correction device having burst gate device receiving the gain-controlled composite color signal and passing only burst pulse by using the delayed horizontal synchronizing signal for the delay, phase comparator comparing phase of the burst pulse with 3.58 MHz reference signal applied from 3.58 MHz pulse generator and detecting error voltage, voltage controlled oscillator for producing predetermined frequency signal adjusted in accordance with the error voltage, and second gate device passing the adjusted frequency signal from the voltage controlled oscillator to be applied to the mixer when the color burst signal in the delayed horizontal synchronizing signal applied from the delay is at a high level.

BRIEF DESCRIPTION OF THE DRAWINGS

The various features and advantages of the present invention will become more apparent from the following specification which sets forth in detail a specific embodiment of the invention. This specifications to be taken with the accompanying drawings in which.

DESCRIPTION OF THE PREFERRED EMBODIMENT

Figure 1:
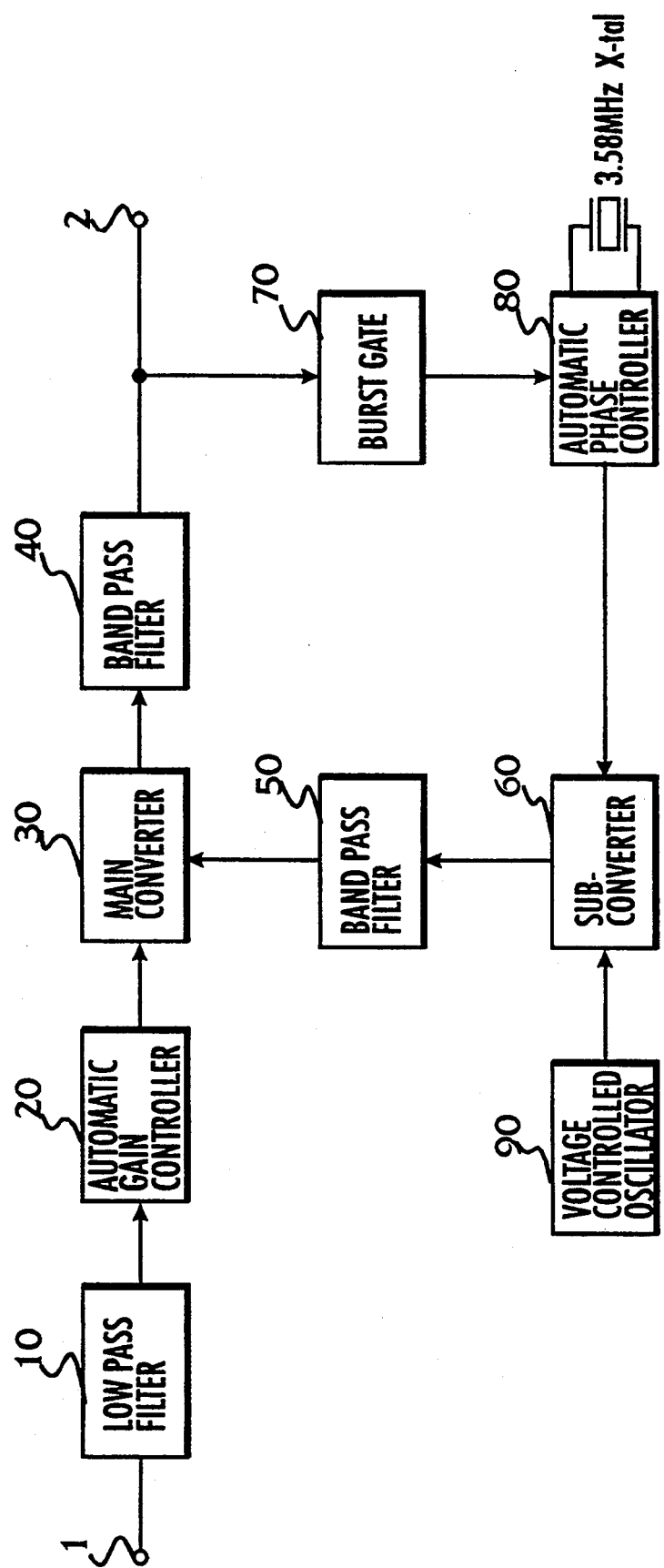
FIG. 1 is a block diagram of prior art a color signal reproducing circuit.
Figure 2:
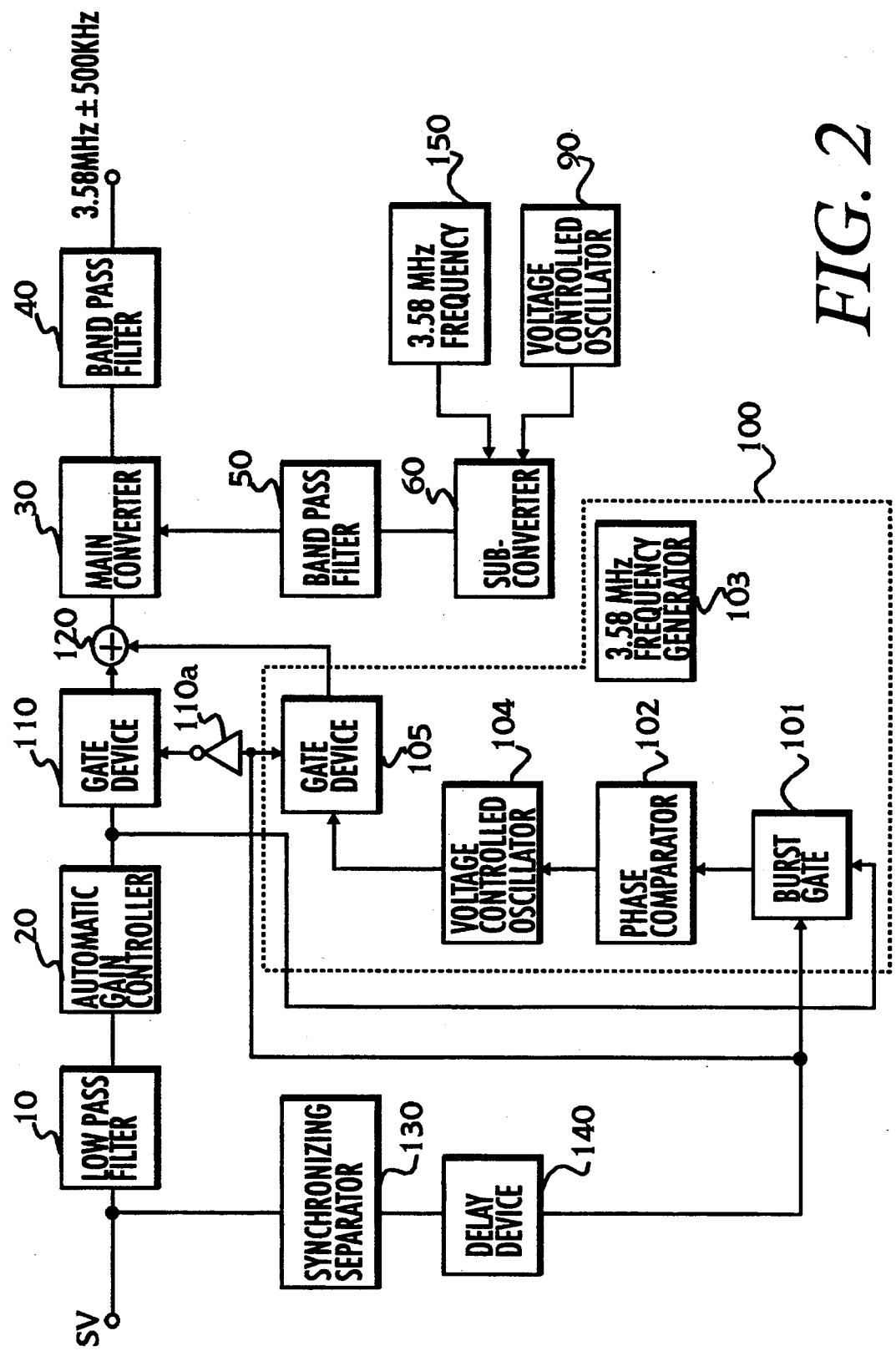
FIG. 2 is a block diagram of a color signal reproducing circuit employing the present invention.

Referring now to FIG. 2, the invention is embodied in a color signals reproducing circuit for accurate correction of phase of color burst signal, which further comprises a phase correction device 100, a first gate device 110 and a mixing device 120.

In FIG. 2, a video signal SV from input terminal 1 is applied through the low pass filter 10 to the automatic gain controller 20. The video signal is read out by reproducing head (now shown) and converted into 629 kHz±500 kHz±Δf frequency signal, being in low range of the video signal by means of the low pass filter 10. The automatic gain controller 20 receives the frequency signal, detects level of color burst signal and controls gain of the color burst signal in accordance with the level of the color burst signal to produce gain-controlled composite color signal. The gain-controlled composite color signal is applied to both of phase correction device 100 and first gate device 110.

The gain-controlled composite color signal is applied to burst gate 101 in the phase correction device 100 which passes only color burst pulses by switching in response to delayed horizontal synchronizing signal from delay device 140. The burst pulse, a 3.58 MHz±Δf frequency signal, is applied to phase comparator 102 for comparison with a 3.58 MHz reference signal. The phase comparator 102 and voltage controlled oscillator 104 generate a predetermined frequency signal phase adjusted in accordance with the error voltage of the phase comparator. The predetermined frequency signal is applied through second gate device 105 to mixing device 120.

Figure 3:
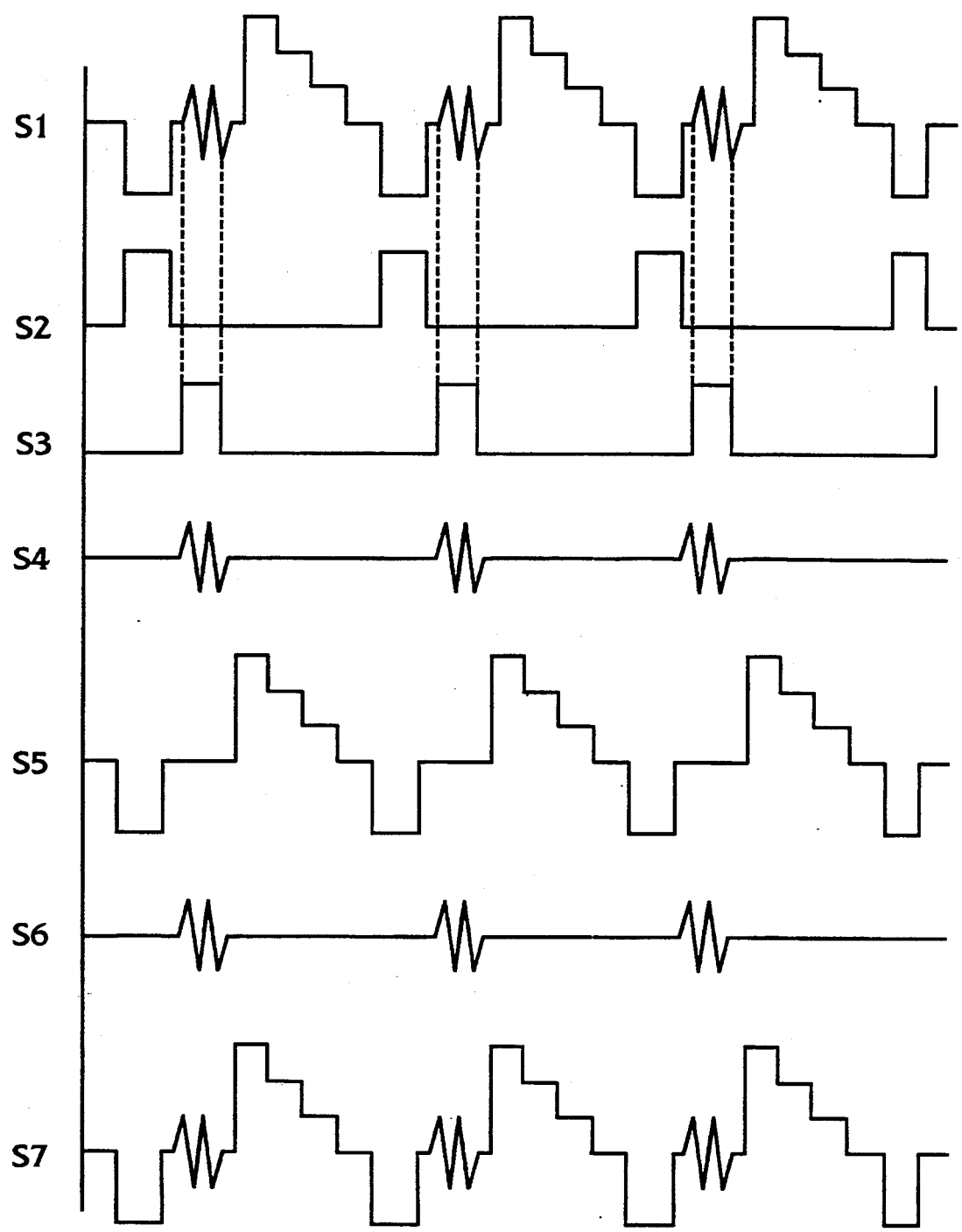
FIG. 3 is waveforms of output signals of respective portions in the circuit as shown in FIG. 2.

In FIG. 2, synchronizing separator 130 separates the video signal S1 (as shown in FIG. 3) into horizontal synchronizing signal S2 or color burt pulse. The delay device 140 delays the horizontal synchronizing signal for predetermined time. The burst gate device 101 and the second gate device 105 are controlled by color burst pulse S3 from the delay device 140, as shown in FIG. 3. The color burst pulse S3 is the delayed horizontal synchronizing signal of the delay device.

The gate device 101 and 105 are made conductive when the color burst pulse S3 is high at a level. Since the first gate device receives color bursts pulse inverted by inverter 110a, the first gate device 110 is not made conductive when the color burst pulse S3 is high level.

Accordingly, the mixing device 120 mixes 629 kHz±500 kHz±Δf+F' color signal S5 from the first gate device 110 and the phase-corrected 3.58 MHz±Δf color burst signal S6, and produces the phase-corrected 629 kHz±500 kHz±F' of frequency signal S7 to be applied to the main converter 30. The main converter 30 subtracts the 629 kHz±500 kHz±F' as being output signal of the mixing means 120 from 4.2 MHz±F' as being output frequency signal of the sub-converter 60, and produces 3.58 MHz±500 kHz chrominance signal.

The sub-converter 60 adds 3.58 MHz signal from frequency generator 150 to 629 kHz±F' signal from voltage controlled oscillator 90, and produces 3.58 MHz±629 kHz±F'. Band pass filter 50 receives the 3.58 MHz±629 kHz±F' signal from the sub-converter 60 and passes only 4.2 MHz±F' signal to be applied the main converter 50.

According to the present invention, a color signal reproducing circuit as described previously may correct phase of color burst signal before converting composite color signal into chrominance signal as being a color signal, in order to limit jitter contained within the composite color signal, and thus may correct accurately the phase.

What is claimed is:

1. A color signal reproducing circuit, comprising:
   low-pass filter means coupled to receive video signals, for providing filtered composite color signals by low pass filtering said video signals;
   automatic gain controller means for generating gain-controlled composite color signals by adjusting gain of said filtered composite color signals;
   phase correction means for generating phase-corrected color burst signals in response to uncorrected color burst signals contained in said gain-controlled composite color signals and in dependence upon a 3.58 MHz reference signal, said phase correction means comprising:
   burst gate means for passing only said uncorrected color burst signals contained in said gain-controlled composite color signals;
   phase comparator means for generating an error voltage by comparing a phase of said uncorrected color burst signals with said 3.58 MHz reference signal; and
   voltage controlled oscillator means for generating said phase-corrected color burst signals in response to said error voltage;
   multiplexer means for generating phase-corrected composite color signals by selectively providing one of said gain-controlled composite color signals and said phase-corrected color burst signals and replacing said uncorrected color burst signals contained in said gain-controlled composite color signals with said phase-corrected color burst signals; and
   converter means or converting said phase-corrected composite color signal into a converted chrominance signal in response to a first frequency signal including phase information.

2. The color signal reproducing circuit as claimed in claim 1, wherein said filtered composite color signals have a frequency of approximately 629 kHz±500 kHz.

3. The color signal reproducing circuit as claimed in claim 1, wherein said video signals are reproduced by a reproducing head of a magnetic recording and reproducing apparatus.

4. The color signal reproducing circuit as claimed in claim 1, further comprising:
   synchronizing separator means for providing horizontal synchronizing signals separated from said video signals; and
   delay means for delaying said horizontal synchronizing signals to generate delayed horizontal synchronizing signals for controlling said multiplexer means.

5. The color signal reproducing circuit as claimed in claim 4, wherein said multiplexer means comprises:
   first gate means for selectively providing said gain-controlled composite color signals in response to inverted delayed horizontal synchronizing signals separated from said video signals;
   second gate means for selectively providing said phase-corrected color burst signals in response to delayed horizontal synchronizing signals; and
   mixing means for mixing said phase-corrected color burst signals provided by said second gate means and said gain-controlled composite color signals provided by said first gate means to thereby generate said phase-corrected composite color signals.

6. The color signal reproducing circuit as claimed in claim 1, wherein said converter means comprises:
   sub-converter means for generating said first frequency signal including phase information; and
   main converter means for frequency shifting said phase-corrected composite color signal in response to said first frequency signal to provide said converted chrominance signal.

7. The color signal reproducing circuit as claimed in claim 1, wherein said first frequency signal is approximately 3.58 MHz and said phase-corrected composite color signals has a center frequency of approximately 629 kHz.

8. A color signal processing circuit, comprising:

means for receiving reproduced composite video signals containing reproduced composite color signals from a recording medium;

means for providing gain-controlled composite color signals by low-pass filtering and gain-controlling said reproduced composite color signals contained in said reproduced composite video signals;

phase correction means for separating reproduced color burst signals contained in said reproduced composite color signals, and for generating phase-corrected color burst signals in response to said reproduced color burst signals, said phase correction means comprising:

burst gate means for passing said reproduced color bursts signals contained in said reproduced composite color signals in response to delayed horizontal synchronizing signals separated from said reproduced composite video signals;

phase comparator means for generating an error voltage by comparing a phase of said reproduced color burst signals with an oscillation signal; and voltage controlled oscillator means for generating said phase-corrected color burst signals in response to said error voltage;

first gate means for enabling selective transmission said gain-controlled composite color signals in response to inverted delayed horizontal synchronizing signals separated from said reproduced composite video signals;

second gate means for enabling selective transmission said phase-corrected color burt signals in response to delayed horizontal synchronizing signals separated from said reproduced composite video signals;

mixer means for mixing said phase-corrected color burst signals provided by said second gate means and said reproduced composite color signals provided by said first gate means to generate corrected composite color signals comprising said phase-corrected color burst signals; and means for converting said corrected composite color signals into converted chrominance signals of higher center frequencies.

9. The color signal processing circuit of claim 8, further comprised of said corrected composite color signals having a frequency of approximately ±500 KHz, and said converted chrominance signals having a frequency of approximately ±3.58 MHz±500 KHz.

10. The color signal processing circuit as claimed in claim 8, wherein said phase-corrected color burst signals have substantially the same frequency as said reproduced color burst signals but have a corrected phase.

11. The color signal processing circuit as claimed in claim 8, further comprising:

means for separating horizontal synchronizing signals from said reproduced composite video signals;

delay means for generating said delayed horizontal synchronizing signal by delaying said horizontal synchronizing signal; and said inverter means for generating said inverted delayed horizontal synchronization signal by inverting said delayed horizontal synchronizing signal.

12. A color signal reproducing circuit, comprising:

low-pass filter means for passing only a composite color signal in a video signal reproduced by a reproducing head of a magnetic recording and reproducing apparatus;

automatic gain controller means for receiving the composite color signal, detecting a level of a color burst signal contained in said composite color signal and controlling an amplitude of the color burst signal in accordance with the detected level to produce an amplitude-controlled composite color signal;

sub-converter means for producing a frequency signal which includes phase information;

main converter means for converting a phase-corrected composite color signal into a 3.58 MHz±500 kHz chrominance signal in response to the frequency signal produced by said sub-converter means;

synchronizing separator means for separating a horizontal synchronizing signal from the video signal;

delay means for providing a delayed horizontal synchronizing signal by delaying said horizontal synchronizing signal for a delayed period;

phase correction means for detecting the color burst signal contained in said amplitude-controlled composite color signal and correcting phase of said color burst signal in response to 3.58 MHz reference signal to produce a phase-corrected color burst signal;

first gate means for removing the color burst signal contained in said amplitude-controlled composite color signal and passing only a color signal from said gain-controlled composite color signal in response to an inverted delayed horizontal synchronizing signal;

mixing means for mixing the phase-corrected color burst signal and the color signal to produce said phase-corrected composite color signal; and said phase correction means comprising burst gate means coupled to receive the gain-controlled composite color signal, for passing only a burst pulse in response to the delayed horizontal synchronizing signal, and phase comparator means for comparing phase of the burst pulse with said 3.58 MHz reference signal and detecting an error voltage;

voltage controlled oscillator means for producing a predetermined frequency signal by adjusting the error voltage; and second gate means for passing the predetermined frequency signal as said phase-corrected color burst signal to be applied to the mixing means in response to the delayed horizontal synchronizing signal.

13. A method for processing color signals, comprising the steps of:

receiving video signals containing composite color signals reproduced from a recording medium;

providing controlled composite color signals by low-pass filtering and gain-controlling said composite color signals;

separating horizontal synchronizing signals from said video signals;

providing delayed horizontal synchronizing signals by delaying said horizontal synchronizing signals for a delayed period;

separating color burst signals contained in said controlled composite color signals in dependence upon said delayed horizontal synchronizing signals;

generating error signals upon comparisons of said color burst signals and reference oscillation signals;

generating phase-corrected color burst signals in response to said error signals;

generating corrected composite color signals by selectively combining said phase-corrected color burst signals and said controlled composite color signals in dependence upon said delayed horizontal synchronizing signals; and converting said corrected composite color signals into chrominance signals by frequency shifting said corrected composite color signal in response to a frequency signal including phase information.

14. A circuit for correcting phase of color burst components in a video signal reproduced from a reproducing head of a magnetic recording and reproducing apparatus, said circuit comprising:

means for providing a composite color video signal containing color burst components from said video signal;

means for generating color burst pulses corresponding to the color burst components from said composite color video signal;

burst gate means coupled to receive the composite color video signal, for passing only the color burst components from said composite color video signal in dependence upon reception of the color burst pulses;

phase correction means for comparing phase of the color burst components with a reference signal correcting the phase of the color burst components to generate phase-corrected color burst components, said phase correction means comprising:

reference signal generator means for generating said reference signal;

phase comparator means for generating an error voltage by comparing a phase of said color burst components with said reference signal; and voltage controlled oscillator means for generating said phase-corrected color burst components in response to said error voltage;

first gate means coupled to receive the phase-corrected color burst components, for enabling transmission of the phase-corrected color burst components in dependence upon reception of the color burst pulses;

second gate means coupled to receive the composite color video signal containing the color burst components, for passing only the composite color video signal in dependence upon reception of inverted color burst pulses;

means for combining the phase-corrected color burst components with the composite color video signal passed through said second gate means to produce a phase-corrected composite video signal of a first frequency band; and converter means for converting said phase-corrected composite color video signal into a converted chrominance signal of a second frequency band different from said first frequency band.

15. The circuit as claimed in claim 14, further comprising:

means for low-pass filtering and gain-controlling said video signal to provide the composite color video signal containing the color burst components;

synchronous means for separating synchronizing pulses from said video signal reproduced from said reproducing head;

delay means for generating the color burst pulses by delaying said synchronizing pulses to said burst gate means, and said first and second gate means for enabling phase correction of said color burst components.

16. The circuit as claimed in claim 14, further comprised of said phase-corrected composite color video signal having said first frequency band of 629 KHz±500 KHz±F', where F' is phase information of the reproducing head of the magnetic recording and reproducing apparatus, and said converted chrominance signal having said second frequency band of 3.58 KHz±500 KHz.

* * * * *

UNITED STATES PATENT AND TRADEMARK OFFICE
CERTIFICATE OF CORRECTION

PATENT NO. : 5.404.230
DATED : April 4, 1995
INVENTOR(S) : Kuen-Pyo HONG

It is certified that error appears in the above-indentified patent and that said Letters Patent is hereby corrected as shown below:

| | | |
|---|---|---|
| Column 1, | line 34, | before "4.2", insert -- a --; |
| | line 58, | after "however", insert a comma -- , --; |
| Column 2, | line 4, | before "invention", insert --present--; |
| | line 25, | after "signal", change "for" to --from--; |
| | line 54, | after "color", change "signals" to --signal--; |
| Column 3, | line 24, | after "device", insert --140--; |
| | line 26, | before "level", change "high at a" to --at a high--; |
| | line 27, | after "receives", change "color bursts" to --a color burst--; |
| | line 29, | after "is", insert --at a--; |
| | line 34, | before "frequency", delete "of"; |
| | line 36, | after "F' ", change "as being output" to --frequency--; |
| | line 37, | after "signal" insert --S7--, and after "F' ", delete "as"; |
| | line 38, | before "frequency", delete "being output"; |
| | line 43, | after "F' " insert --frequency signal--; |
| | line 44, | after "F' " insert --frequency--; and |
| Column 4, | line 20, | after "means", change "or" to --for--: |

UNITED STATES PATENT AND TRADEMARK OFFICE
CERTIFICATE OF CORRECTION

PATENT NO. : 5,404,230
DATED : April 4, 1995
INVENTOR(S) : Kuen-Pyo HONG

It is certified that error appears in the above-indentified patent and that said Letters Patent is hereby corrected as shown below:

| | | |
|---|---|---|
| Claim 7, | line 66, | after "color", change "signals" to --signal--: |
| Claim 8, | line 26, | before "said" insert --of--; |
| | line 30, | before "said" insert --of--; |
| | line 31, | change "burt" to --burst--; |
| | line 32, | before "delayed" insert "said"; and |
| | line 37, | change "reproduced" to --gain-controlled--: |
| Claim 9, | line 3, | change "±500" to --629 Khz±500 KHz±F'--: |
| Claim 11, | line 5, | change "signal" to --signals--; |
| | line 6, | change "signal" to --signals--; |
| | line 8, | change "signal" to --signals--; and |
| | line 9, | change "signal" to --signals--: |
| Claim 14, | line 12, | before "video", insert --color--; and |
| | line 18, | before "correcting" insert --and for-- |
| Claim 15, | line 8, | after "head;" insert --and--: |

UNITED STATES PATENT AND TRADEMARK OFFICE
CERTIFICATE OF CORRECTION

PATENT NO. : 5,404,230
DATED : April 4, 1995
INVENTOR(S) : Kuen-Pyo HONG

It is certified that error appears in the above-identified patent and that said Letters Patent is hereby corrected as shown below:

Claim 15, line 8, after "head;" insert --and--:

Signed and Sealed this

Twenty-fifth Day of March, 1997

Attest:

Attesting Officer

BRUCE LEHMAN
Commissioner of Patents and Trademarks